June 2, 1953 E. F. DUFFY 2,640,710
SELF-ADJUSTING TRACTOR TRAILER DRAFT DEVICE
Filed March 11, 1949
Fig. 1.
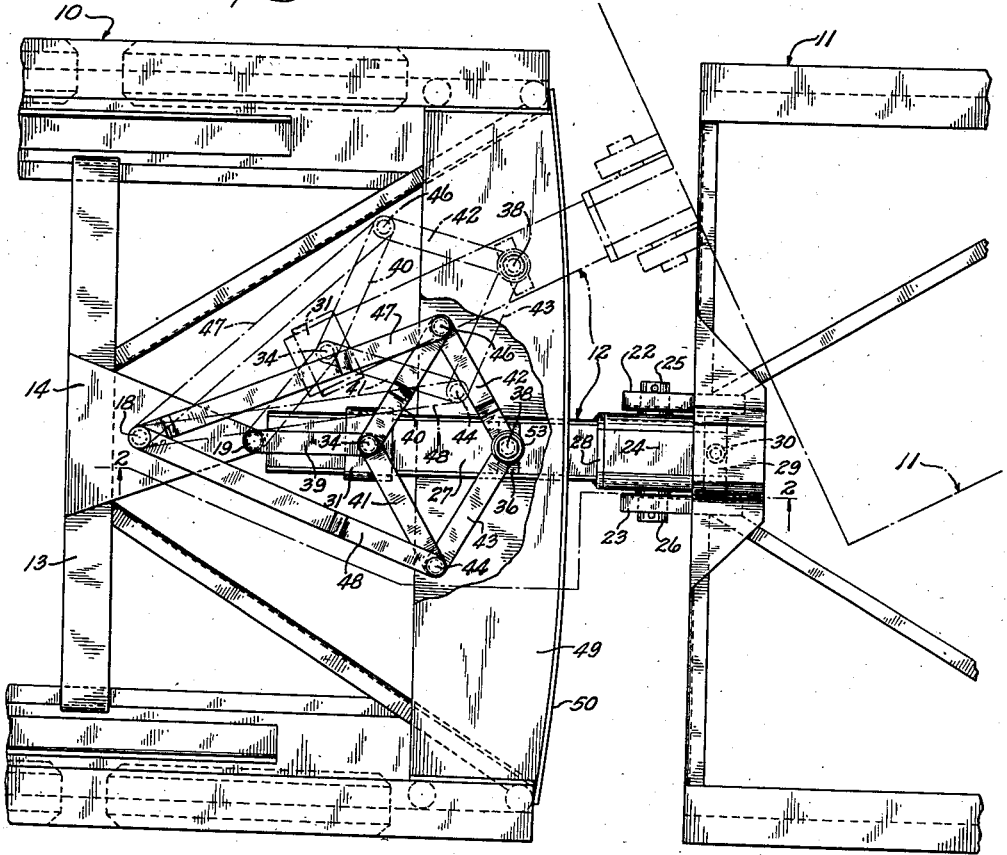
Fig. 2.
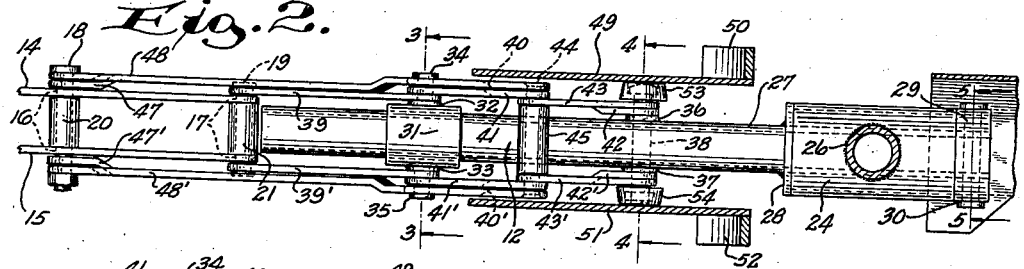
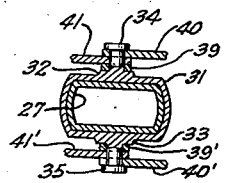
Fig. 3.
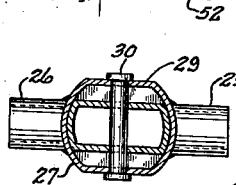
Fig. 4. Fig. 5.
INVENTOR.
Edward F. Duffy,
BY Morsell & Morsell
ATTORNEYS.

Patented June 2, 1953

2,640,710

UNITED STATES PATENT OFFICE 2,640,710

SELF-ADJUSTING TRACTOR-TRAILER DRAFT DEVICE

Edward F. Duffy, La Crosse, Wis., assignor to La Crosse Trailer Corporation, La Crosse, Wis., a corporation of Wisconsin Application March 11, 1949, Serial No. 80,860

12 Claims. (Cl. 280—33.44)

This invention relates to improvements in tractor-trailer hitches.

The majority of the hitches now in use for the purpose of pivotally coupling trailers to tractors are of the "fifth wheel" type. When using this type of coupling, either the trailer must be spaced a considerable distance from the tractor, or portions of the front end of the trailer must be rounded off to provide adequate turning clearance between the tractor and the trailer, in order that the trailer body will not contact or interfere with any part of the tractor during relative turning movements.

A particularly serious turning problem is presented in certain articulated vehicles, such as tractor-trailer auto transport assemblages. Laws prescribe the limits as to length, width and height for such vehicles, and, in order to utilize the maximum amount of space within the prescribed limits for auto carrying purposes, it is essential that the rear end of the tractor body and the forward end of the trailer body of such vehicles be substantially square and in close proximity.

It has heretofore been proposed to provide a tractor-trailer hitch which maintains the trailer coupled closely to the tractor when the trailer is in an alined position behind the tractor, and which longitudinally displaces the trailer away from the tractor upon a substantial turning movement of the assemblage. The hitches heretofore proposed, however, have not been entirely satisfactory and have had objections and limitations.

In my Patent No. 2,485,371 I have disclosed one improved type of extensible tractor-trailer hitch.

It is a general object of the present invention to provide a tractor-trailer hitch of the drawbar type which maintains the trailer and tractor in closely coupled relationship when alined, and which displaces the trailer away from the tractor during a turning operation.

A further object of the invention is to provide a tractor-trailer hitch of the class described having a drawbar which is automatically extensible in response to swinging movement thereof in a horizontal plane.

A further object of the invention is to provide a hitch of the class described wherein the drawbar has incorporated therein a lazy tong linkage, there being means associated with said linkage to cause extensible movement thereof in response to swinging movement of the drawbar.

A further object of the invention is to provide a tractor-trailer hitch which is simple in construction, which is positive in operation, which is inexpensive to manufacture, which is strong and durable, and which is otherwise well adapted for the purposes described.

With the above and other objects in view, the invention consists of the improved tractor-trailer hitch, and its parts and combinations as set forth in the claims, and all equivalents thereof.

Referring to the drawing accompanying and forming a part of this specification, wherein is disclosed one complete embodiment of the preferred form of the invention, and wherein the same reference characters indicate the same parts in all of the views:

Fig. 1 is a fragmentary plan view of the adjacent end portions of a tractor-trailer chassis with the same being connected by the improved hitch, parts being broken away;

Fig. 2 is an enlarged longitudinal vertical sectional view taken approximately along the line 2—2 of Fig. 1;

Fig. 3 is a transverse vertical sectional view taken along the line 3—3 of Fig. 2;

Fig. 4 is a transverse vertical sectional view taken along the line 4—4 of Fig. 2; and Fig. 5 is a transverse vertical sectional view taken along the line 5—5 of Fig. 2.

Referring more particularly to Fig. 1 of the drawing, the numeral 10 indicates the rear end of the tractor of an articulated auto transport vehicle, and the numeral 11 indicates the forward end of the trailer of said articulated vehicular assemblage. The numeral 12 indicates the drawbar of the improved hitch for connecting the tractor 10 with the trailer 11.

A structural member 13 extends transversely across the lower portion of the tractor chassis 10 and is spaced forwardly of the rear end of said chassis and the body carried thereby. Fixed, as by bolting or welding, to the upper and lower surfaces of the member 13 are rearwardly extending spaced parallel triangular plates 14 and 15 which are preferably positioned on the longitudinal axis of the tractor chassis. The plates 14 and 15 are each formed with corresponding spaced vertically extending apertures 16 and 17 therethrough (see Fig. 2). The apertures 16 and 17 are preferably also positioned on the longitudinal axis of the tractor chassis and are adapted to respectively receive pins 18 and 19. A pair of spacing sleeves 20 and 21 surround the pins 18 and 19, respectively, and extend between the plates 14 and 15, as shown in Fig. 2.

Projecting forwardly from the lower portion of the forward end of the trailer body 11 are a pair of spaced parallel bearing members 22 and 23.

A tubular yoke member 24 is formed on opposite sidewall surfaces with alined horizontally outwardly extending trunnions 25 and 26, and said trunnions are journalled respectively in the bearings 22 and 23. The axis of the yoke 24 is preferably coincident with the longitudinal axes of the trailer chassis 11. The yoke 24 preferably has rounded side walls and flat upper and lower surfaces, as is clearly shown in Fig. 5.

A normally horizontally extending tubular shaft 27 is positioned with one end telescopically fitted into the yoke 24, as shown in Figs. 1 and 5. The shaft 27 preferably has curved sidewalls having outer diameters substantially equal to the inner diameter of the curved side walls of the yoke 24. The shaft 27 also preferably has flat upper and lower sidewalls which are spaced substantially closer together than those of the yoke 24, as shown in Fig. 5. A vertically extending plate 28 surrounds the shaft 27 and is preferably welded thereto. The plate 28 is in abutment with the forward end of the yoke 24, as shown in Figs. 1 and 2. A collar 29, having substantially the same cross sectional shape as the yoke 24, is positioned in abutment with the rear end of said yoke. A vertically extending pin 30 fixedly connects the collar 29 to the shaft 27 by passing through alined apertures therein as shown in Figs. 2 and 5. This arrangement fixedly connects the shaft 27 to the yoke 24.

A sleeve 31, having an inner cross sectional outline substantially identical with the outer cross sectional outline of the shaft 27 (see Fig. 3), surrounds said shaft and is adapted to slide longitudinally thereon. The sleeve 31 is formed with bosses 32 and 33 on its upper and lower faces respectively, from which project vertically extending pins 34 and 35 respectively.

Intermediate its length the shaft 27 is formed with transversely extending bosses 36 and 37 on its upper and lower surfaces. The bosses 36 and 37 and the shaft 27 are apertured to receive a vertically extending pin 38 which projects therethrough (see Figs. 2 and 4).

A horizontally extending link 39 is pivotally connected at one end to the pin 19 above the plate 14 and is pivotally connected at its other end to the pin 34 on the sleeve 31. An identical link 39' is similarly connected to the pin 19 below the plate 15 and to the pin 35 of the sleeve 31. A pair of horizontal links 40 and 41, which are preferably of equal length, are also pivotally connected at one end to the pin 34 of the sleeve 31. The links 40 and 41 project angularly outwardly and rearwardly as shown in Fig. 1. A corresponding pair of links 40' and 41' are similarly connected to the pin 35. Pivotally connected at one end to the outer ends of the links 40 and 41, respectively, are links 42 and 43. Corresponding links 42' and 43' are connected to the outer ends of the links 40' and 41'. A single pin 44 is preferably used as the pivotal connection member for the links 41 and 43 as well as for the links 41' and 43', there being a spacer sleeve 45 positioned around said pin between the links 43 and 43', as shown in Fig. 2. Similarly, a single pin 46 may be used for connecting the links 40 and 42 as well as for the links 40' and 42'.

The links 42 and 43 are pivotally connected at their other ends to the upper end portion of the pin 38, and the links 42' and 43' are similarly connected to the lower end portion of the pin 38. A pair of relatively long links 47 and 48 of preferably equal length are pivotally connected at one end to the pin 18 above the plate 14. The link 47 is pivotally connected at its other end to the upper end portion of the pin 46. The link 48 is connected at its other end to the upper end portion of the pin 44. A pair of corresponding links 47' and 48' are pivotally connected to the pin 18 below the plate 16 and to the lower end portions of the pins 44 and 46.

Extending transversely across the rear end of the tractor chassis 10 above the improved drawbar 12 is a horizontal plate 49. The plate 49 may have an arcuate rear edge to which is fixed, as by welding, a stiffening bar 50. Extending transversely of the tractor body below the drawbar 12 and parallel with the plate 49 is a plate 51. The plate 51 is preferably of the same shape as the plate 49 and may have a stiffening bar or plate 52 fixed, as by welding, to the rear edge thereof.

In order that all of the stresses created by forces from the trailer tending to swing the rear end of the drawbar 12 vertically need not be taken by the pins 18 and 19, a cup-shaped member 53 may be carried by the upper end of the pin 38, and a similar cup-shaped member 54 may be carried by the lower end of the pin 38, as shown in Figs. 1, 2 and 4. The member 53 projects upwardly into sliding contact with the under side of the upper plate 49, and the member 54 projects downwardly into sliding contact with the upper surface of the lower plate 51. The drawbar 12 is prevented from swinging downwardly or upwardly by the coaction of the members 53 and 54 and the plates 49 and 51, whereas swinging movement in a horizontal plane is permitted thereby.

In operation, the improved tractor-trailer hitch normally assumes the position shown in solid lines in all of the views of the drawing. In this position, the shaft 27 is coaxial with the longitudinal axes of both the tractor and the trailer. This condition obtains when the tractor and the trailer are traveling along a straightaway, and it is because of this straight line movement that the trailer is alined with the tractor.

When, however, the tractor is turned to one side or the other in negotiating a curve, the trailer, in following the tractor, becomes horizontally angularly displaced relative to the tractor. As this displacement occurs, the shaft 27 remains alined with the axis of the trailer and swings in a horizontal plane with the pin 18 as its axis. For the purpose of clarity of description it will be assumed that the tractor turns toward the right and thereby causes angular displacement of the trailer toward the dot and dash position of Fig. 1, with corresponding swinging movement of the shaft 27 toward the dot and dash line position shown in Fig. 1.

In explaining the operation of the improved drawbar, only the movement of the upper set of links, designated by unprimed numerals, will be followed with particularity. The lower set of links corresponding to the upper links are substantially identical thereto and are at all times alined with the corresponding links in the upper set.

As the drawbar 12 swings in the direction indicated, it pivots about the pin 18 as shown in Fig. 1. During this swinging movement, however, the link 39 pivots about the pin 19 to the dot and dash line position shown. As the link 39 swings from its neutral position, it moves the pin 34 toward the pin 18. This movement of the pin 34, through the links 40 and 41, draws the pins 44 and 46 toward each other. Simultaneously, through the links 42 and 43 the pin 38 is moved away from the pin 18. It is apparent that the links 42, 43, 47 and 48 form a "lazy tong" linkage which is extensible as the divergent portions of the links 47 and 42 are drawn toward the divergent portions of the links 48 and 43.

Since the pin 18 is fixed to the tractor vehicle, and since the pin 53 is fixed to the shaft 27, (which is in turn connected to the trailer through the yoke 24) it is apparent that the trailer 11 is displaced longitudinally from the tractor 10 by the drawbar 12 upon swinging movement of the drawbar 12 away from its neutral position. As the shaft 27 moves outwardly, its forward portion slides in the sleeve or collar 31 which maintains the proper alinement of said shaft relative to the linkage. The axis of the shaft 27 is, therefore, substantially coincident with the axis of the drawbar 12.

In effect, the drawbar 12 is extended simultaneously as it is swung, to thereby displace the trailer longitudinally from the tractor whenever there is horizontal angular displacement of the tractor relative to the trailer. As will be noted from Fig. 1, when the trailer is angularly displaced to the dot and dash line position therein, the trailer body is clear of the tractor body, and there is no interference, one with the other.

As the tractor and the trailer negotiate the turn and begin to return toward the straight line relationship shown in solid lines in Fig. 1, the drawbar 12 swings back toward its normal position. As it does so, the link 39 swings back toward its normal position, thereby moving the pin 34 away from the pin 18, spreading the pins 44 and 46 apart, and moving the pin 53 toward the pin 18. This, of course, causes the shaft 27 to move forwardly toward its normal position wherein it maintains the trailer closely coupled to the tractor. The improved hitch operates in substantially the same manner when the drawbar 12 is swung in either horizontal direction from its neutral position.

It is apparent that the improved hitch provides an efficient means for connecting a trailer having a body with a square front end to a tractor having a body with a substantially square rear end. When the vehicles are in alined position, they are closely coupled and, upon horizontal angular displacement of said vehicles relative to one another, the trailer is automatically displaced rearwardly from the tractor.

The improved hitch provides a means of utilizing the maximum amount of space within the length and width limitations provided by the laws regulating such vehicular assemblages. The improved hitch is positive in operation; it is easy and very inexpensive to manufacture; and it is particularly well adapted for use in articulated auto transport vehicles.

Various changes and modifications may be made without departing from the spirit of the invention, and all of such changes are contemplated, as may come within the scope of the claims.

What is claimed as the invention is:

1. In a two-unit tractor-trailer assemblage, an extensible drawbar interposed between the tractor and the trailer for coupling purposes; comprising a first pair of diverging links having their adjacent ends pivotally connected to one unit of the assemblage; a second pair of diverging links having their adjacent ends pivotally connected to the other unit of the assemblage and having their divergent end portions pivotally connected to the divergent end portions of the links of said first pair; and means connected to the divergent end portions of said first and second pairs of links and also connected to one of the units of the assemblage for causing converging movement of the divergent end portions of said links and extensible movement of said drawbar in response to swinging movement of said drawbar relative to the tractor.

2. In a two-unit tractor-trailer assemblage, an extensible drawbar interposed between the tractor and the trailer for coupling purposes; comprising a first pair of diverging links having their adjacent ends pivotally connected to one unit of the assemblage; a second pair of diverging links having their adjacent ends pivotally connected to the other unit of the assemblage and having their divergent end portions pivotally connected to the divergent end portions of the links of said first pair; a third pair of links connected to each other at one end and having their other ends pivotally connected to the divergent end portions of said first and second pairs of links; and means connected to said third pair of links and also connected to one of the units of the assemblage for causing converging movement of the divergent end portions of said first and second pairs of links and extensible movement of said drawbar in response to swinging movement of said drawbar relative to the tractor.

3. An extensible drawbar for coupling a trailer and a tractor comprising, a first pair of diverging links adapted to have their adjacent ends pivotally connected to a tractor; a second pair of diverging links adapted to have their adjacent ends pivotally connected to a trailer and having their divergent end portions pivotally connected to the divergent end portions of the links of said first pair; and means connected to the divergent end portions of the first and second pairs of links and adapted to be connected to said tractor for causing converging movement of said divergent end portions and extensible movement of said drawbar in response to swinging movement of said drawbar relative to the tractor.

4. An extensible drawbar for coupling a trailer and a tractor comprising, a first pair of diverging links adapted to have their adjacent ends pivotally connected to a tractor and to extend rearwardly therefrom; a second pair of diverging links adapted to have their adjacent ends pivotally connected to a trailer and to extend forwardly therefrom, said second links having their divergent forward end portions pivotally connected to the divergent end portions of the links of said first pair; a third pair of links connected to each other at one end and having their other ends pivotally connected to the divergent end portions of said first and second pairs of links; and means connected to said third pair of links and adapted to be connected to said tractor for causing converging movement of said divergent end portions and extensible movement of said drawbar in response to swinging movement of said drawbar relative to said tractor.

5. In a tractor-trailer assemblage, an extensible drawbar for coupling the trailer and tractor comprising, a first pair of diverging links having their adjacent ends pivotally connected to the tractor and extending rearwardly therefrom; a second pair of diverging links having their adjacent ends pivotally connected to the trailer and extending forwardly therefrom, said second links having divergent forward end portions pivotally connected to the divergent end portions of said first pair of links; a third pair of links connected to each other at one end and having their other ends pivotally connected to the divergent end portions of said first and second pairs of links; and another link connected to said third pair of links and also connected to said tractor at a point spaced rearwardly from the forward ends of said first pair of links for causing converging movement of said divergent end portions and extensible movement of said drawbar in response to swinging movement of said drawbar relative to the tractor.

6. In a tractor-trailer assemblage, an extensible drawbar for coupling the trailer and tractor comprising, a shaft connected to the trailer adjacent one end; a sleeve slidable on said shaft and spaced from said end; a first pair of diverging links having their adjacent ends pivotally connected to the tractor; a second pair of diverging links having their adjacent ends pivotally connected to said shaft intermediate its length and having their divergent end portions pivotally connected to the divergent end portions of the links of said first pair; and means connected to said tractor and to said links for causing converging movement of said divergent end portions of said links and extensible movement of said drawbar in response to swinging movement of said drawbar relative to the tractor.

7. In a tractor-trailer assemblage, an extensible drawbar for coupling the trailer and tractor comprising, a shaft connected to the trailer adjacent one end; a sleeve slidable on said shaft and spaced from said end; a first pair of diverging links having their adjacent ends pivotally connected to the tractor; a second pair of diverging links having their adjacent ends pivotally connected to said shaft intermediate its length and having divergent end portions pivotally connected to the divergent end portions of the links of said first pair; a third pair of links connected to each other and to said sleeve at one end and having their other ends pivotally connected to the divergent end portions of said first and second pairs of links; a link connected to said tractor and to said third pair of links for causing converging movement of said divergent end portions of said links and extensible movement of said drawbar in response to swinging movement of said drawbar relative to the tractor; and means for restricting said drawbar to movement in a horizontal plane.

8. In a tractor-trailer assemblage, an extensible drawbar interposed between the tractor and the trailer for coupling purposes, comprising: a parallelogram linkage having a front joint, a rear joint, and a pair of transversely opposite intermediate joints, said parallelogram linkage being swingably connected to the tractor at said front joint, and said rear joint being connected to the trailer; and means connected to one of the units of the assemblage and to at least one of said intermediate joints for moving said intermediate joints toward each other in response to swinging movement of the parallelogram linkage, to thereby move the rear joint and the trailer rearwardly.

9. In a two-unit tractor-trailer assemblage, an extensible drawbar interposed between the tractor and the trailer for coupling purposes, comprising: a composite linkage having a front joint, a rear joint, and a pair of transversely opposite intermediate joints, said linkage being swingably connected to the tractor at said front joint, and said rear joint being connected to the trailer; and means including another link connected to one of the units of the tractor-trailer assemblage and to said front joint for moving said intermediate joints toward each other in response to swinging movement of the composite linkage, to thereby move the rear joint and the trailer rearwardly.

10. In a tractor-trailer assemblage, an extensible drawbar interposed between the tractor and the trailer for coupling purposes, comprising: a parallelogram linkage having a front joint, a rear joint, and a pair of transversely opposite intermediate joints, said rear joint being connected to the trailer; a second linkage connected to at least one of said intermediate joints and to the tractor for swingably connecting the parallelogram linkage to the tractor; and a link connected at one end to said front joint and swingably connected at its other end to said tractor at a point rearwardly of the axis of swinging movement of the parallelogram linkage, whereby said front joint is moved forwardly in response to swinging movement of the parallelogram linkage, to thereby move said rear joint and the trailer rearwardly.

11. In a tractor-trailer assemblage, an extensible drawbar interposed between the tractor and the trailer for coupling purposes, comprising: a parallelogram linkage having a front joint, a rear joint, and a pair of transversely opposite intermediate joints; a shaft projecting forwardly from the trailer in fixed longitudinal alinement therewith, said rear joint having a draft connection with said shaft; a collar connected to said front joint and in which said shaft is slidably received; linkage connected to at least one of said intermediate joints and to the tractor for swingably connecting the parallelogram linkage to the tractor; and means connected to said front joint and to the tractor for moving said front joint forwardly in response to swinging movement of the parallelogram linkage, to thereby move said rear joint and the trailer rearwardly.

12. In a tractor-trailer assemblage, an extensible drawbar interposed between the tractor and the trailer for coupling purposes, comprising: a parallelogram linkage having a front joint, a rear joint, and a pair of transversely opposite intermediate joints; a shaft projecting forwardly from the trailer in fixed longitudinal alinement therewith, said rear joint having a draft connection with said shaft; a collar connected to said front joint and in which said shaft is slidably received; linkage connected to at least one of said intermediate joints and to the tractor for swingably connecting the parallelogram linkage to the tractor; and a link connected at one end to said front joint and swingably connected at its other end to said tractor at a point rearwardly of the axis of swinging movement of the parallelogram linkage, whereby said front joint is moved forwardly in response to swinging movement of the parallelogram linkage, to thereby move said rear joint and the trailer rearwardly.

EDWARD F. DUFFY.

References Cited in the file of this patent

UNITED STATES PATENTS

| Number | Name | Date |
| --- | --- | --- |
| 1,992,164 | Arner | Feb. 26, 1935 |
| 2,001,408 | Burton | May 14, 1935 |